(12) United States Patent
Marcianesi et al.

(10) Patent No.: US 8,624,439 B2
(45) Date of Patent: Jan. 7, 2014

(54) DELIVERY OF ELECTRIC POWER BY MEANS OF A PLURALITY OF PARALLEL INVERTERS AND CONTROL METHOD BASED ON MAXIMUM POWER POINT TRACKING

(75) Inventors: Andrea Marcianesi, Arezzo (IT); David Martini, S. Giovanni Valdarno (IT); Simone Soldani, Levane (IT)

(73) Assignee: Power-One Italy S.p.A., Arezzo (IT)

( * ) Notice: Subject to any disclaimer, the term of this patent is extended or adjusted under 35 U.S.C. 154(b) by 722 days.

(21) Appl. No.: 12/663,499

(22) PCT Filed: Jun. 6, 2007

(86) PCT No.: PCT/IT2007/000400
§ 371 (c)(1),
(2), (4) Date: Jul. 27, 2010

(87) PCT Pub. No.: WO2008/149393
PCT Pub. Date: Dec. 11, 2008

(65) Prior Publication Data
US 2010/0283325 A1    Nov. 11, 2010

(51) Int. Cl.
*H02J 3/00*    (2006.01)
(52) U.S. Cl.
USPC .................. 307/82; 363/42; 363/71; 363/72; 136/244
(58) Field of Classification Search
USPC .................. 307/82; 363/42, 71–72; 136/244
See application file for complete search history.

(56) References Cited

U.S. PATENT DOCUMENTS

| | | | |
|---|---|---|---|
| 5,327,071 A | 7/1994 | Frederick et al. | |
| 5,896,281 A * | 4/1999 | Bingley | 363/71 |
| 6,175,512 B1 * | 1/2001 | Hagihara et al. | 363/71 |
| 6,311,137 B1 * | 10/2001 | Kurokami et al. | 702/60 |
| 6,838,611 B2 * | 1/2005 | Kondo et al. | 136/244 |
| 7,248,490 B2 * | 7/2007 | Olsen et al. | 363/71 |
| 7,965,088 B2 * | 6/2011 | Thorngreen et al. | 324/538 |
| 2003/0218888 A1 * | 11/2003 | Suzui et al. | 363/34 |

FOREIGN PATENT DOCUMENTS

EP    1047179    10/2000
EP    1047179 A1 * 10/2000

* cited by examiner

*Primary Examiner* — Jared Fureman
*Assistant Examiner* — Alfonso Perez Borroto
(74) *Attorney, Agent, or Firm* — Waddey Patterson; Mark J. Patterson

(57) ABSTRACT

The system provides for one or more photovoltaic panels (3) or other energy sources, connected to a series of inverters (5) in parallel, the outputs of which are connected to a load (Z) and/or to an electricity distribution grid (7). One of the inverters operates as master unit and generates a power control signal in order to track the maximum power point that can be obtained from the panels (3). The other inverters operate as slave units. The control is performed so that all the inverters absorb a variable quantity of power according to the fluctuations in the power available at the output of the photovoltaic panels (3) or other source subject to fluctuations.

26 Claims, 5 Drawing Sheets

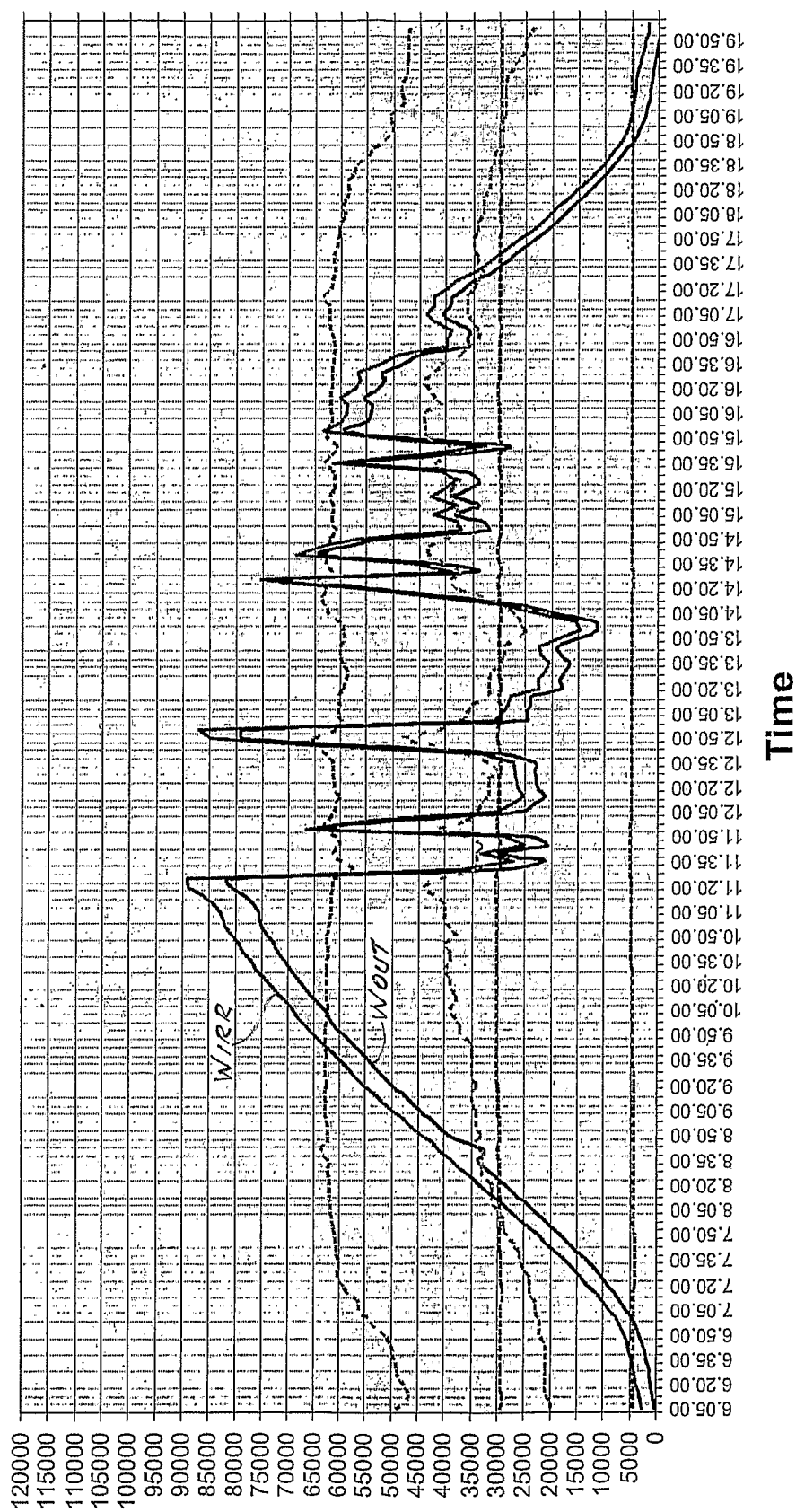

DELIVERY OF ELECTRIC POWER BY MEANS OF A PLURALITY OF PARALLEL INVERTERS AND CONTROL METHOD BASED ON MAXIMUM POWER POINT TRACKING

TECHNICAL FIELD

The present invention concerns improvements to the systems for production of electricity from renewable sources, for example (but not exclusively) photovoltaic panels or other sources subject to fluctuation in the power delivered. In particular, the present invention concerns improvements to the methods and devices for controlling systems for the production of electricity having the function of maximizing the extraction of polder.

STATE OF THE ART

To tackle the problem of environmental pollution and the growing demand for electricity also for domestic use, the installation of distributed electricity generator units is currently being promoted for the supply of medium-sized loads, for example in housing and commercial facilities or in industrial environments. These generator units use alternative energy, and in particular renewable sources such as solar energy, via photovoltaic, cells forming panels or so-called photovoltaic arrays, or wind energy by means of wind generators.

Typically, an alternative energy source of this type, which generates a direct current, is combined with a power conditioning unit, comprising an inverter. The inverter is connected in parallel to the grid, so that a generic local load can be supplied by the grid or the inverter or both. When the power supplied by the alternative source is insufficient to power the load, it is powered wholly or partly by power taken from the grid. Vice versa, when the load absorbs less power than that provided by the alternative source, or when the load is not powered, the power generated by the alternative source is fed into the grid.

In some cases the alternative source is connected solely to a load and an accumulator, but not to the grid.

The alternative energy source can consist of photovoltaic panels. These can be connected to the grid and to the load by means of converters which must basically perform two functions. Firstly, they must ensure that when the operating conditions vary, the maximum power possible is always extracted from the renewable source. Secondly, they must ensure that the converter output current is in phase with the grid voltage. The first of the two functions is also defined as MPPT, or Maximum Power Point Tracking.

In the case of the photovoltaic panels, for example, the power that can be extracted from the photovoltaic array depends on the conditions of radiation or sunlight, i.e. on the amount of solar energy striking the cells, and is a function of the voltage applied at the terminals of the photovoltaic array and therefore at the converter input. FIG. 1 shows a diagram of the pattern of the characteristic voltage-current curve of a typical photovoltaic array, as well as the pattern of the power that can be extracted from the photdvoltaic array (Ppv) in various sunlight conditions as the voltage varies at the ends of the photovoltaic array. W1, W2, . . . Wn indicate the power curves as a function of the voltage V at the terminals of the photovoltaic array in different sunlight conditions Irr. The curves W1, W2 . . . Wn are relative to decreasing sunlight Irr. I indicates the characteristic voltage-current curve of the photovoltaic array.

From FIG. 1 it can be seen that each curve Wi has a maximum point characterized by voltages V which are gradually lower as the sunlight is reduced. In other words, as the solar radiation diminishes, the electric power that can be extracted from the photovoltaic array diminishes, furthermore maximum power is obtained by operating the photovoltaic array at voltages that vary according to temperature and sunlight. M is the curve passing through the maximum points of the curves W1, W2, . . . Wi, . . . Wn.

The curve Wi on which the system operates, said system consisting of the photovoltaic array and the converter connected to the load and/or to the grid, depends on the sunlight conditions that can vary at random. The maximum power point tracking function, which the converter must perform, therefore serves to maintain the voltage at the terminals of the photovoltaic array at a value as near as possible to the one corresponding to the maximum point of the curve Pi on which the photovoltaic array is operating at that moment. In FIG. 1 said values are indicated by V1, V2, . . . Vn.

Examples of inverter controls for photovoltaic panels with MPPT function are described in U.S. Pat. No. 4,649,334; U.S. Pat. No. 5,869,956; U.S. Pat. No. 5,747,967; U.S. Pat. No. 5,327,071; U.S. Pat. No. 6,590,793; U.S. Pat. No. 6,844,739; U.S. Pat. No. 5,923,100; U.S. Pat. No. 6,433,522; U.S. Pat. No. 6,882,131; U.S. Pat. No. 6,914,418; U.S. Pat. No. 6,919,714; U.S. Pat. No. 4,404,472; US-A-2005/0116671; U.S. Pat. No. 4,494,180; US-A-2005/0110454; US-A-2003/0066555.

To absorb high powers generated by large photovoltaic arrays or other renewable energy sources, for example high-power wind generators, systems have been produced with one single high-power inverter. These systems have the drawback that if the inverter fails, all the energy produced until repair of the inverter is lost. If the system is not connected to the grid but is the sole source of electricity for a given utility, inverter failure means that no electricity is supplied to said utility, with obvious and possibly serious inconveniences.

Modular systems have therefore been produced, i.e. comprising a plurality of modules each comprising an inverter. Each inverter is sized to absorb a part of the power that can be generated by the source with which the inverters are combined. In these systems the failure of an inverter can entail at worst a reduction in the power delivered but not stoppage of the delivery, thanks to the redundancy provided by the plurality of inverters in parallel.

An example of a modular system of this type is described in U.S. Pat. No. 6,800,964. Said system comprises a plurality of photovoltaic panels, which can be connected to a plurality of inverters by means of two switch units. The arrangement is such that, by commutating the switches, a variable number of photovoltaic panels can be connected to a variable number of inverters. This, system has the drawback of involving a high cost due to the presence of a large number of switches which, in addition to being subject to failure, require a relatively complex control system for commutation.

U.S. Pat. No. 6,285,572 describes a photovoltaic system with a plurality of inverters in parallel. In this type of system one of the inverters is selected as master, i.e. as a machine or unit that controls the others, and to which the other modules or units are hierarchically subject, i.e. they behave like slave units. The various modules can be positioned via the closure of a connection switch between the photovoltaic panel or panels and the modules themselves. The number of modules connected depends on the power per surface unit collected by the panels. In ideal conditions of atmospheric stability and absence of cloud, the power radiated gradually increases when the sun rises until it reaches a maximum value and then gradually tails off until sunset. In an ideal situation of this type, the number of modules operating is first gradually increased, after which it is maintained stable and then gradually reduced. The modules are controlled so that all the active modules operate at constant power, i.e. they supply a constant electric power at the output, while only one of them absorbs and delivers a variable power. This module is the one that supervises the others, i.e. the master module. Only this module performs the MPPT algorithm, and modifies the operating conditions according to the power collected by the panels.

This system solves the problem of management of the MPPT algorithm, attributing the function of MPPT only to the master module, while the others are controlled by the master module so as to deliver a fixed power. This way of managing the modular system has one substantial drawback, however: impossibility of prompt adaptation to variation in the conditions of sunlight, i.e. variation of the power radiated by the sun and collected by the photovoltaic panels.

Indeed, the sunlight versus time curve is only ideally a substantially continuous curve, first increasing and then decreasing. In reality, when the sun is obscured by clouds, the amount of power radiated is unpredictably and significantly modified. When the power radiated is suddenly reduced by the passage of a cloud, the system described in U.S. Pat. No. 6,285,572 requires a relatively long time to re-identify, via execution of the MPPT algorithm, the operating point that permits extraction of the maximum power from the panel towards the grid. This point is determined by a voltage value at the photovoltaic panel output and therefore at the inverter input, which is set by the MPPT algorithm and is different for each sunlight value, i.e. for each value of the power radiated onto the photovoltaic panels. This known system is not able to adequately manage these transients, consequently resulting in a substantial loss of power, since the output voltage of the photovoltaic panels cannot be promptly brought to the optimal value in any sunlight condition, i.e. to the value that permits extraction of maximum power from the panels.

OBJECTS AND SUMMARY OF THE INVENTION

One object of the present invention is to provide a method for controlling or managing an electric power generation system, comprising at least one direct current source that delivers an electric power subject to fluctuations, which makes it possible to achieve greater efficiency in extraction of the electric power from said source.

The object of one embodiment of the invention is to provide a method for controlling or managing a power generation system with one or more photovoltaic panels connected to a plurality of inverters in parallel.

A further object of the invention is also the production of a system for controlling or managing a plurality of inverters that can be connected in parallel to an electric power source to optimize operation of the system.

Substantially, according to one aspect, the invention provides a method for controlling an electric power generation system comprising at least one direct current source, which delivers an electric power subject to fluctuations, and a plurality of inverters provided, with respective control units, the inputs of which are connected to said source and which transform the electric power at the input into ac-electric power at the output with controlled frequency and voltage, said method comprising the steps of: selecting one of said inverters as the master unit and the remaining inverters as slave units; performing, via said master unit, an algorithm for maximum power point tracking and generating a control signal via said master unit. Characteristically, according to one aspect of the invention, the control signal is used to control both the master and slave units, so that said units deliver a variable power, which tracks the power fluctuations at the output of said direct current source.

Unlike some traditional techniques, the inverters operate at variable power, tracking—via the MPPT algorithm performed by one of said inverters—the maximum power point corresponding to the condition of the system at that moment. This ensures very rapid system adaptation to variable operating conditions. For example, if the power source comprises one or more photovoltaic panels, the system thus controlled tracks very efficiently and rapidly the maximum power point on the power-voltage curve, maximizing the extraction of available power.

In an embodiment of the invention the slave units are controlled so that they all deliver substantially the same output power.

In a possible embodiment, the power delivered by the inverters is controlled by controlling the phase displacement between voltage and current at the output of the inverters.

In an improved embodiment of the invention, the number of active inverters connected in parallel at the output of said direct current source can be varied over time, in order to minimize the number of inverters active and optimize the output of each inverter, according to the maximum theoretical power that can be delivered by said source according to the weather.

According to a different aspect, the invention concerns an electric power DC/AC conversion system, comprising: a plurality of inverters that can be connected in parallel and are provided with respective control units, wherein: each of said inverters is suitable for receiving at the input a dc-electric power subject to fluctuations and for delivering an ac power at controlled frequency and voltage; the control units are programmed to select one of said inverters as a master unit and the others as slave units; the master unit performs a maximum power point tracking algorithm on the direct current fluctuating at the input of said inverters and generates an inverter control signal. Characteristically, the control units are programmed so as to control each slave unit and the master unit according to said control signal coming from the master unit, in order to provide at the output of said units an ac power, variable according to the fluctuating input power.

The system can comprise a dc power source, the output of which is connected to the inputs of said inverters. Said source can comprise one or more photovoltaic panels.

Further advantageous characteristics of the method and system according to the invention are specified in the attached claims and will be described in further detail below with reference to some implementation, examples.

BRIEF DESCRIPTION OF THE DRAWINGS

The invention will be better understood by following the description and accompanying drawings, which show a practical non-limiting embodiment of the invention. More specifically, the drawings show the following:

FIGS. 4A and 4B: a diagram of the power extracted according to time from a system of the type illustrated in FIG. 3 in two typical days with variable weather;

DETAILED DESCRIPTION OF AN EMBODIMENT OF THE INVENTION

Here below the present invention will be described with specific reference to an application to a system of photovoltaic panels for exploitation of solar energy, but the principles underlying the invention can also be used in systems based on other renewable energy sources.

Figure 1:
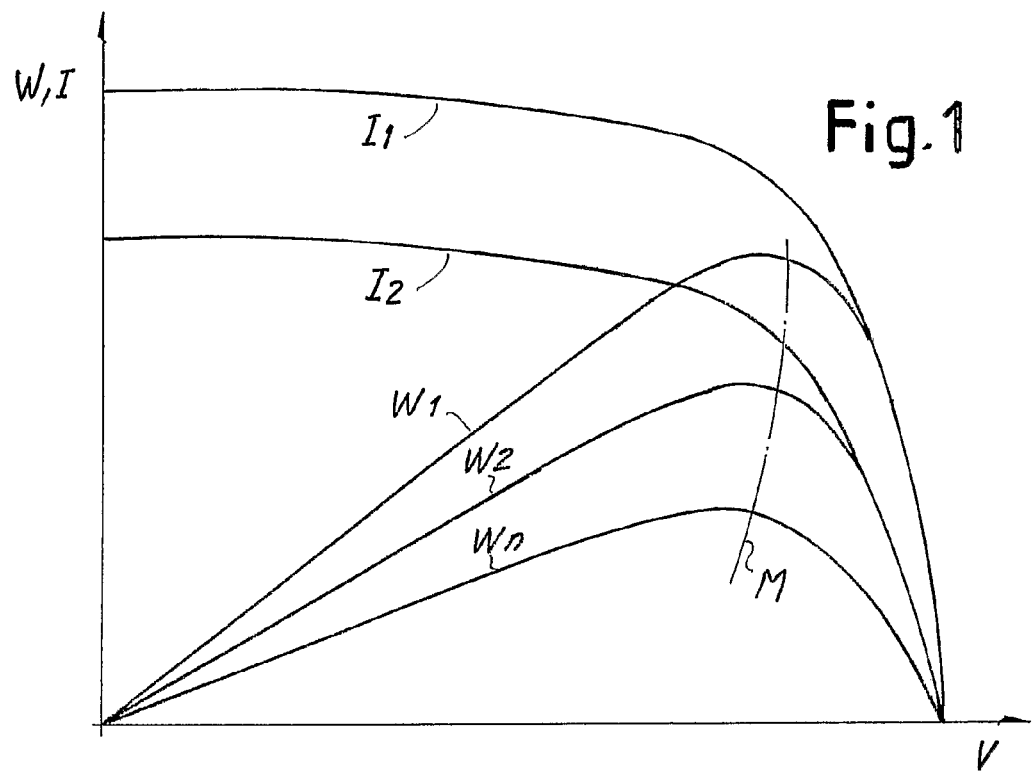
FIG. 1: characteristic curves of a photovoltaic panel.

FIG. 1 shows the characteristic current and power curves according to the voltage at the output of the photovoltaic panel, already referred to in the introduction of the present description.

Figure 2:
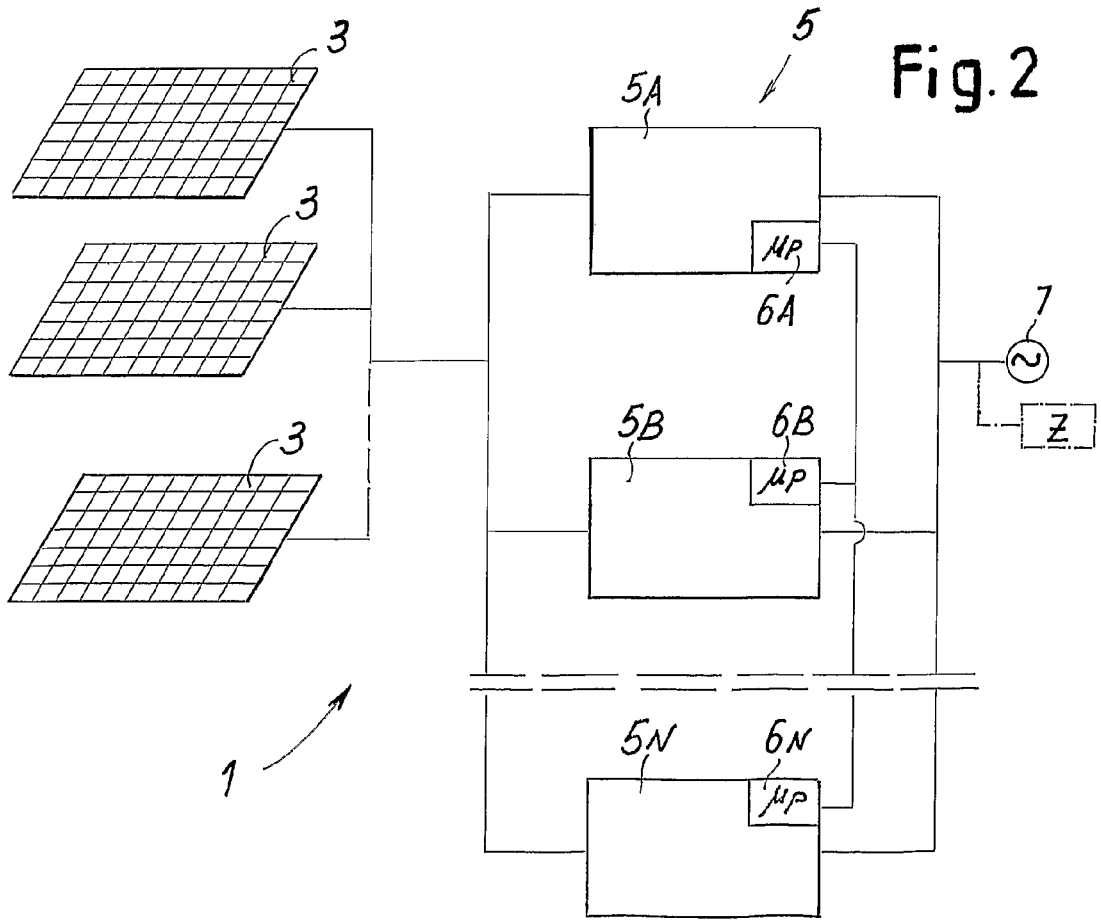
FIG. 2: a simplified block diagram of a system with an electric power source consisting of a series of photovoltaic panels, to which several inverters in parallel are connected.

FIG. 2 very schematically shows a plant or system 1 for generation of electricity via the use of a series of photovoltaic panels 3. The photovoltaic panels 3 are connected to a plurality of inverters indicated overall by 5 and individually indicated by 5A, 5B . . . 5N. The inverters 5, each of which is provided with a control unit 6A, 6B . . . 6N, are interconnected in parallel and the outputs are connected to a grid 7, schematized as an ideal voltage generator. The inverters can also be connected to a local load indicated schematically with a broken line by Z. When the power absorbed by the loads Z is below the power that can be delivered by the panels 3, the excess power can be fed into the grid 7. Vice versa, when the photovoltaic panels do not supply power (for example at night) or supply a power below the value required by the loads Z, the extra power is supplied by the grid 7.

The method used to control the inverters 5 in order to optimize extraction of power from the photovoltaic panels 3 as the conditions of sunlight vary forms a specific subject of the invention. The variation in sunlight, i.e. the power per surface unit collected by the photovoltaic panels 3, is due both to the movement of the sun along its apparent orbit with a consequent gradual increase and subsequent gradual reduction in the power collected by the panels 3 during the course of the day, and to the variation in atmospheric conditions, in particular the passage of clouds which reduce the power radiated onto the panels 3.

To better understand the method for controlling or managing the system 1, reference will be made to a configuration (FIG. 3) in which only two inverters 5A and 5B are provided with the corresponding control unit, connected to the grid 7 and to the load Z. However, it should be noted that the method can be applied also to a system with a higher number of inverters.

Figure 3:
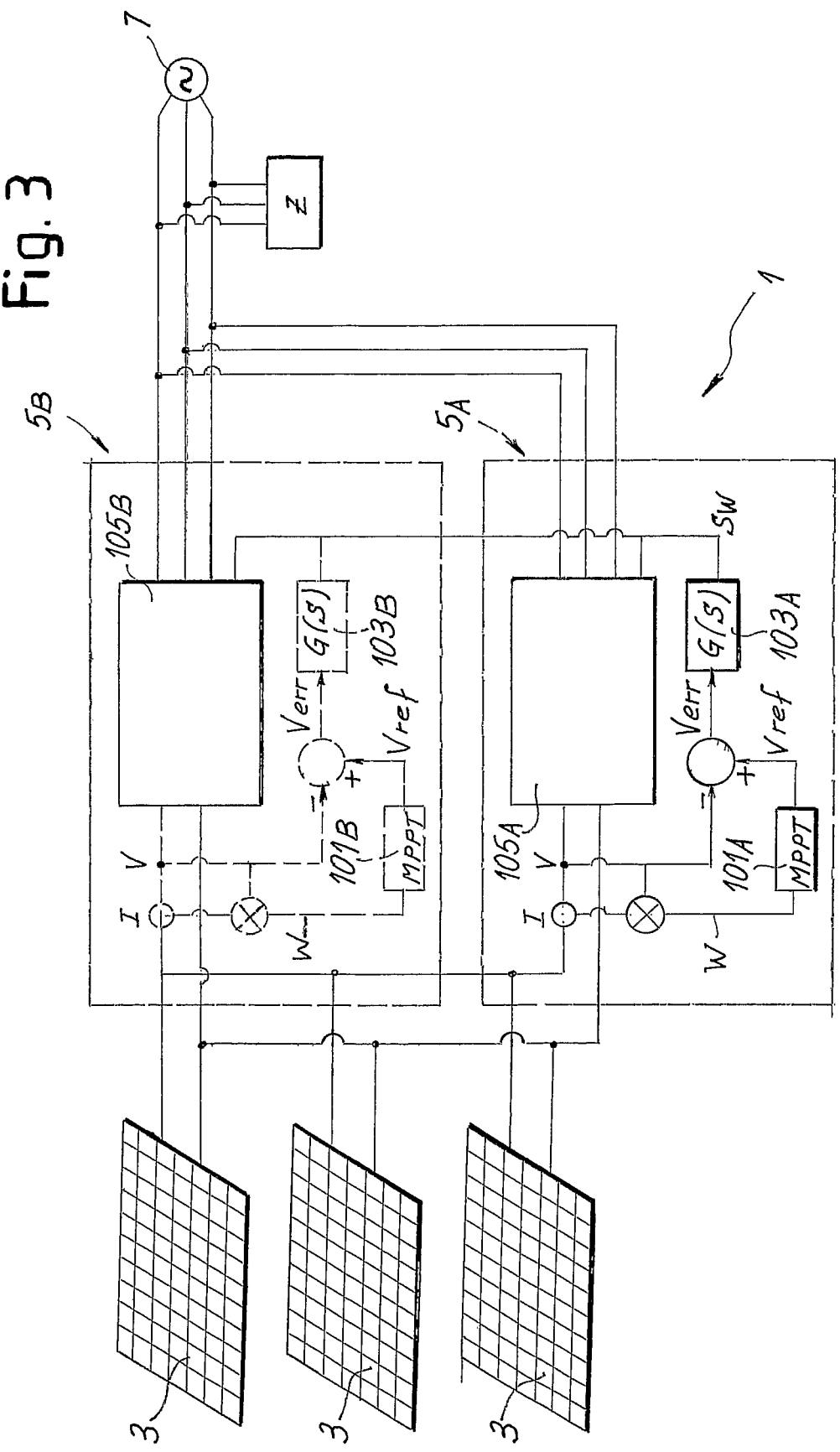
FIG. 3: a diagram in greater detail of a system with two inverters connected in parallel to a photovoltaic source.

As schematically shown in FIG. 3, in particular for the inverter 5A, a control network is provided in order to perform an MPPT algorithm and to track, as the sunlight varies, the maximum point on the power-versus-voltage curve (curves W1, W2, . . . Wn in FIG. 1). For said purpose the inverter 5A is combined with a block 101A which performs an MPPT (Maximum Power Point Tracking) algorithm, which receives at input a signal proportional to the power W absorbed by the inverter 5A. The signal proportional to the power is obtained by multiplying the current and voltage value at the inverter input. At the output of the module 101A a reference voltage signal $V_{ref}$ is supplied which, subtracted from the output voltage of the photovoltaic panels and therefore from the input voltage of the inverters, supplies an error signal $V_{err}$. 103A indicates a compensation network which generates a power control signal $S_W$, which is used to drive the circuit 105A of the inverter 5A and the equivalent circuit 105B of the inverter 5B to modulate the power absorbed by the single inverters and delivered at the inverter outputs.

The MPPT algorithm can be any algorithm and is known per se. For example it can be an algorithm of the perturb-and-observe type, known to those skilled in the art and not described in detail here. For the purposes of the present description, it is sufficient to remember summarily the operation of this type of algorithm. The module 101A generates at regular intervals a reference voltage perturbed with respect to the voltage generated in the preceding step, by a positive or negative value, according to the result of the preceding perturbation cycle. Via the signal $V_{err}$ obtained from comparison with the actual voltage at the output of the photovoltaic panels, the control unit supplies a power control signal $S_W$, which modifies the operating conditions of the inverter 5 so as to bring the voltage at the inverter input (and therefore at the output of the photovoltaic panels) to the value $V_{ref}$. This variation in output voltage causes (due to the shape of the characteristic power-voltage curve, see FIG. 1), a variation in the power at the input of the inverter 5A. If this variation is positive, i.e. if the voltage perturbation caused by the block 101A is such as to produce an increase in the power extracted by the photovoltaic panels, this means that the voltage perturbation is moving the system towards the maximum point of the curve Wi (W1, W2, . . . Wn) corresponding to the sunlight condition at that moment. Subsequently, the voltage will be perturbed again with a perturbation of the same sign. In the opposite case, i.e. if the power at the inverter input drops due to the perturbation induced on the voltage, this means that the variation in voltage at the output of the panels caused by the perturbation is moving the system away from the maximum point of the power-voltage curve. In the subsequent step, the block 101A will consequently cause a perturbation of the voltage in the opposite direction.

According to the invention, when both the inverters 5A, 5B (or the various inverters of a multi-stage system with more than two inverters) are in an active condition, the control signal $S_W$ generated by one of them (in the case of FIG. 3 the inverter 5A) will cause an analogous variation in the operating conditions of all the other inverters.

Therefore, in the configuration shown in FIG. 3, the inverter 5A behaves as a master unit and performs, via its control unit, the MPPT algorithm to generate the power control signal $S_W$. The latter is used not only to drive the inverter 5A, but also the inverter 5B. The latter therefore behaves as a slave unit. If the system comprises further inverters 5C, 5D etc., all these will behave as slave units, controlled by the same master unit 5A.

A similar control network comprising a module 101B and a compensation network 103B also for the inverter 5B is indicated by a broken, line in FIG. 3. This indicates that also the latter can perform the function of master, making the inverter 5A work as a slave.

In general, any one of the inverters 5A, 5B can be selected to operate as master unit and the other will consequently behave as slave unit.

In the configuration illustrated, the signal $S_W$ is used directly for both the units 5A, 5B and therefore the latter deliver the same power at the output. This, however, is not strictly essential. For example, the two inverters can absorb and deliver different powers, although they, are both modulated via the same signal $S_W$ generated by the same master unit 5A as described above.

The master unit and slave unit can be selected in various ways. To obtain a balanced exploitation of the system, for example, at each start-up of the system 1, the inverter that worked as slave unit in the previous operating cycle can be scheduled for selection as master unit. If there are more than two inverters, they can be scheduled for sequential selection as master unit at each operating cycle, i.e. for each day of operation.

Alternatively, at each start-up of the system 1 each inverter can be scheduled to generate a random number. In this case the control unit of the single inverters will include a random number generation function. These numbers can then be compared and the inverter that generated the highest or lowest random number will be selected as master unit.

In general the master unit selection routine is preferably activated each time the system is started up, i.e. typically every time the photovoltaic panels 3 begin to receive power when the sun rises. This is not essential, however. Selection can be more frequent, modifying the choice of the master unit during the day, or less frequent, maintaining the selection of a certain inverter as master unit for several operating cycles (days).

In a possible embodiment, the same inverter can always be used as master unit and the other or others always as slave. In this case, the inverters always used as slave units can be designed such as not to have the same control unit as the master unit; in this case, for example, they would not have to be able to perform the MPPT algorithm and therefore could be without the respective hardware or software components for the control of this function. However, it may be convenient for at least two or more inverters to be configured to perform the MPPT algorithm, so as to obtain a redundant system, which can operate also in the event of failure of, one of the MPPT blocks or the compensation networks.

The possibility of always using the same inverter as master unit without the need to perform a selection every time is due to the fact that in this embodiment all the inverters are always active and all deliver the same power. There is therefore no non-uniform exploitation, of the inverters.

With the system described above, which assigns execution of the MPPT algorithm to one single inverter and manages, all the inverters with one single power control signal generated by the master unit, optimal behavior can be obtained as regards adaptation of the system to variation in the conditions of sunlight. This is shown in particular by the experimental curves in the diagrams of FIGS. 4A and 4B, corresponding to two different days of operation. On the X axes of these diagrams is the time shown in five-minute intervals from 6 a.m. to 8 p.m. On the Y axes is the power. $W_{IRR}$ indicates the curve representing the variation of the power collected by the panels, i.e. the power radiated by the sun onto the panels. $W_{OUT}$ indicates the curve representing the total power output of the system, i.e. of the two inverters in parallel, 5A, 5B.

Figure 4A:
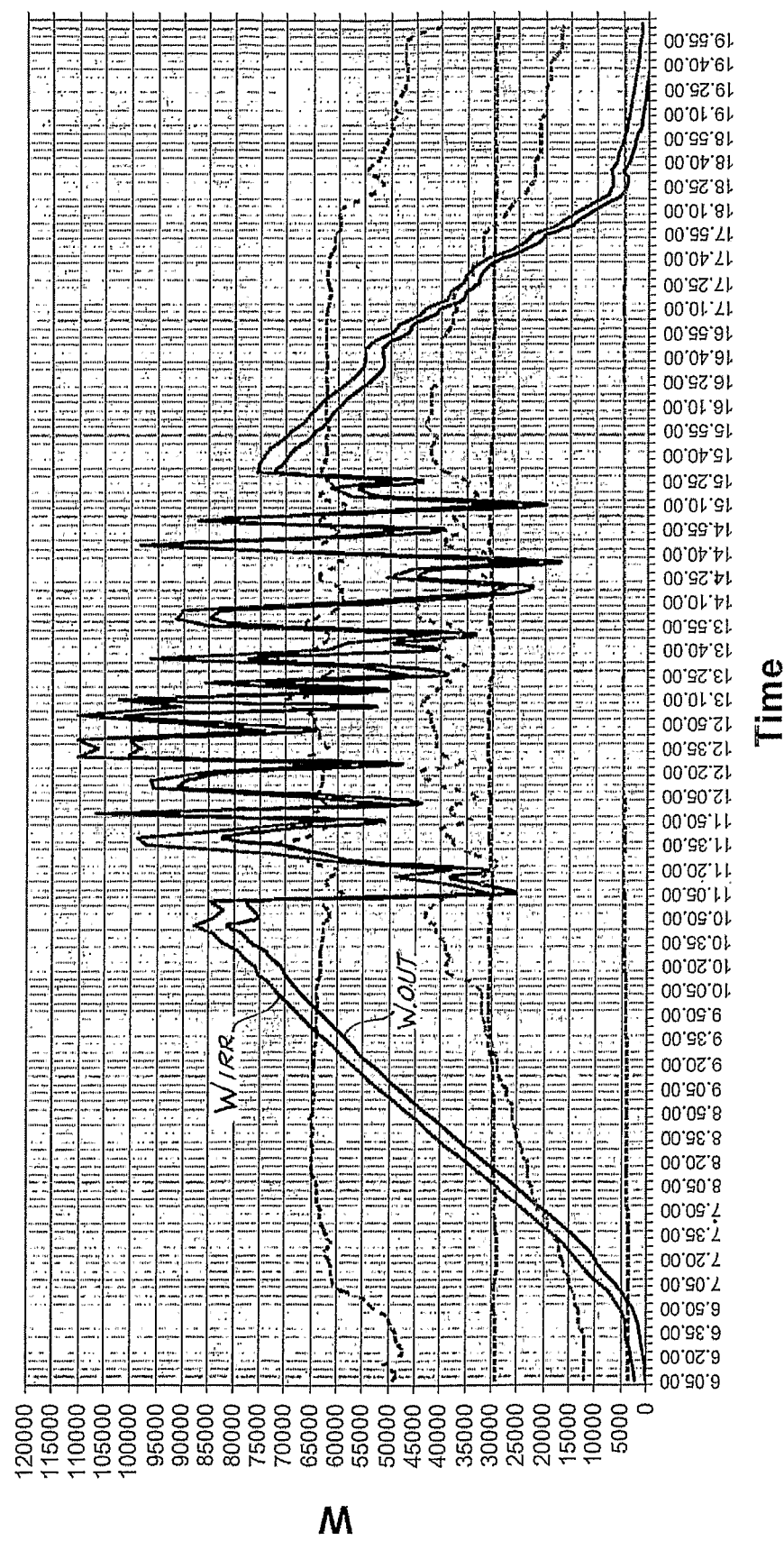

The diagram of FIG. 4A shows a sunlight curve that gradually increases with a substantially continuous trend until approximately 10:30 a.m. At this point the radiated power curve undergoes abrupt fluctuations due to the passage of clouds which reduce the overall radiating power that reaches the panels. From approximately 3:30 p.m. until sunset the power continuously decreases.

The experimental curve $W_{IRR}$ indicates, substantially, that in the central part of the specific day to which the curve refers, the power collected by the panels has undergone marked fluctuations due to the passage of clouds, especially in the central part of the day. The curve $W_{OUT}$ follows the trend of the curve $W_{IRR}$ very faithfully and rapidly. This means that the power actually extracted from the panels via the inverters 5A, 5B is almost equal to the power actually available. Only a minimal part of the power is lost due to the fact that as the sunlight conditions vary, the system has to adapt the voltage at the output of the panels via execution of the MPPT algorithm in order to find, in all sunlight conditions, the maximum point of the respective curve W1, W2, . . . Wn (FIG. 1).

Similar considerations can be made with reference to the diagram of FIG. 4B, which refers to a different day, with less favorable meteorological conditions.

The use of one single control loop (101A, 103A) which performs the MPPT algorithm and the use of the single power control signal ($S_W$) generated by this loop for controlling all the inverters permits this extremely quick reaction of the system to the variation in the conditions of sunlight and therefore rapid tracking of the maximum power point as sunlight conditions vary.

The above refers to a system with two inverters permanently connected to the panels and both always operating, absorbing equal power. It is not necessary, however, for all the inverters of a multi-stage system to be always operating; on the contrary, in some respects it, could be useful to operate a variable number of inverters during the course of the day, for the reasons which will now be clarified with specific reference to FIGS. 5 and 6.

Figure 5:
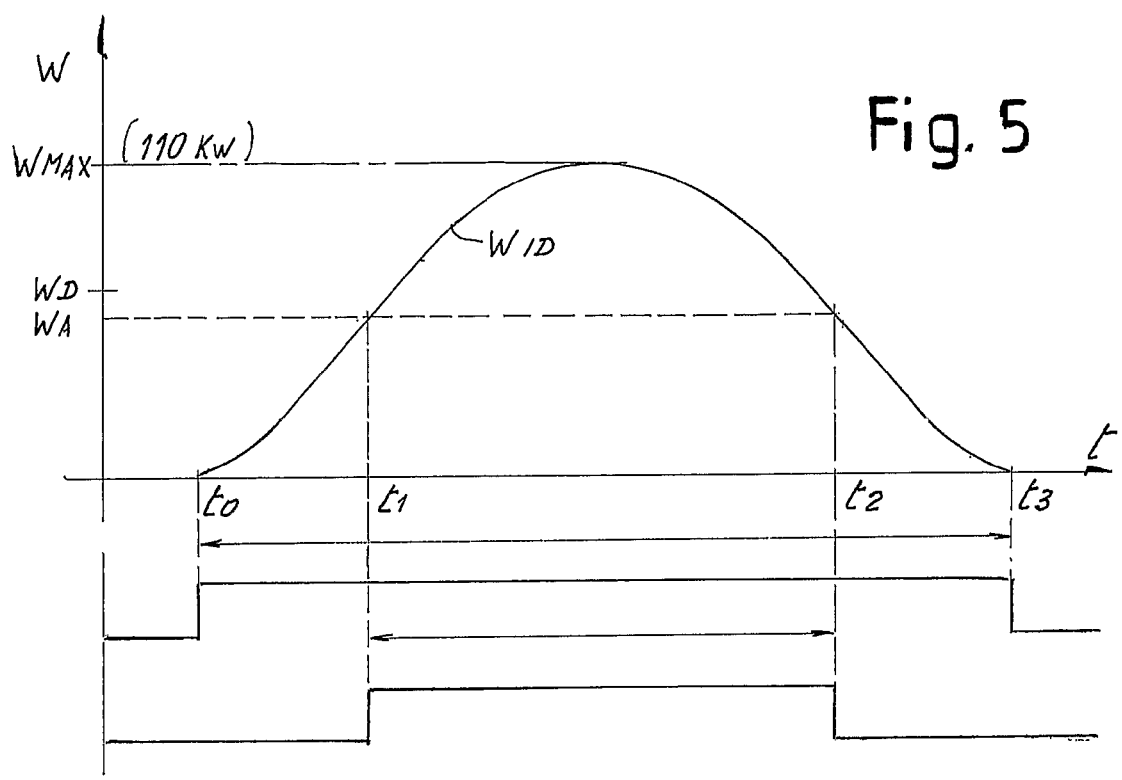
FIG. 5: a diagram showing the ideal trend of the power available in a photovoltaic system without atmospheric disturbances.

FIG. 5 shows in the upper diagram the ideal shape of the curve $W_{ID}$ representing the power collected by the photovoltaic panels as a function of time in the course of a day. This ideal curve is the one that would be shown in FIG. 4A or 4B on a bright cloudless, day for the whole interval of time during which the solar radiation strikes the panels. Observing the curve of FIG. 5, it can be seen that the maximum power that can be extracted from the photovoltaic panels varies from a minimum of 0 to a maximum indicated by $W_{MAX}$. Supposing, for example, that this maximum power is equal to 110 kW, it is evident that for a part of the day (and more particularly in the initial and final part of the period during which the sun shines) the maximum power that can be delivered by the panels could be entirely absorbed by one single inverter, which in the example illustrated is assumed to have a rated power of 50 kW.

Figure 6:
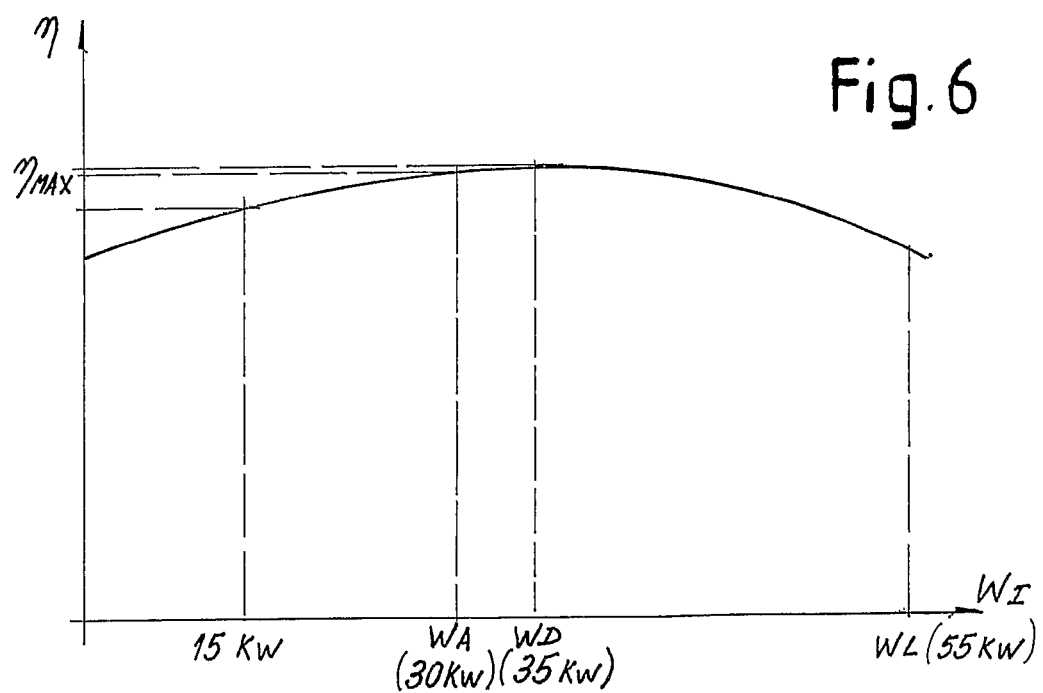
FIG. 6: the curve of the inverter efficiency as a function of the power delivered.

Observing FIG. 6, it can be noted that the efficiency (shown on the Y axis) of an inverter according to the power absorbed by it (shown on the X axis) has an initially increasing trend up to a value $\eta_{MAX}$ and subsequently e decreasing trend until it reaches a minimum corresponding to the maximum power that can be absorbed by the inverter. $W_D$ indicates on the X axis the value of the design power, in the example illustrated approximately 35 kW, corresponding to maximum efficiency of the inverter.

In certain operating conditions, to increase the efficiency of the inverter it is evidently expedient for the power at the output of the panels to be absorbed by one single inverter instead of two, so that said inverter works nearer the design point $W_D$ corresponding to maximum efficiency. In fact, if e.g. a power of 30 kW is available at the output of the panels, and this is distributed in equal parts on the two inverters (15 kW each), each of them, due to the internal losses, will have a lower efficiency than that of one single inverter that absorbs all the available power.

According to some known techniques, to reduce the number of inverters active and therefore increase the power absorbed by each inverter and overall system efficiency, a gradually increasing number of inverters is switched on as a function of time, following the ideal curve $W_{ID}$ of FIG. 5. In this case the known techniques provide for all the active inverters to operate at constant power, except for one inverter used as master unit, which performs the MPPT algorithm and absorbs a variable part of the power available at the output of the panels. This technique, described for example in U.S. Pat. No. 6,285,572, has the drawback of the system being extremely slow to adapt to variation in the conditions of sunlight, therefore resulting in a considerable loss of power as it is not able to efficiently track the maximum power point on the characteristic curves of the photovoltaic panels. In practice, this known technique is optimized to operate in conditions of total absence of cloud, a situation that does not occur in reality.

An improved embodiment of the present invention combines the technique of gradual switch-on of the inverters as the power theoretically available on the panels increases and the control method described above, performed by master unit which generates a powder modulation signal that manages in parallel and simultaneously all the units, both master and slave.

Substantially, according to this improved embodiment of the invention, the interval $t_0$-$t_3$ (FIG. 5) in which power is radiated onto the panels, can be divided into sub-intervals, during which the number of inverters active changes. More specifically, one of the two inverters (typically the inverter selected as master unit) remains on for the entire interval $t_0$-$t_3$. Vice versa, the other of the two inverters is switched on only in the time interval $t_1$-$t_2$, as schematically shown by the two step curves below the diagram of FIG. 5, which represent the switch-on/switch-off conditions of each of the two inverters.

Unlike the traditional techniques, instead of determining the moment of switch-on of the second inverter according to the actual power available, the system can be managed so that the second inverter is switched on and then off at predefined instants in time, $t_1$, $t_2$ respectively. These time instants correspond on the ideal curve $W_{ID}$ to a theoretically available power $W_A$ slightly below, for example, the design power $W_D$ to which the maximum efficiency of each inverter 5A, 5B corresponds.

During the intervals $t_0$-$t_1$ and $t_2$-$t_3$ the single inverter active, selected as master, will perform the MPPT algorithm and will generate a power control signal $S_W$ which will be used only by the master inverter, while the slave inverter is dormant. In the time interval $t_1$-$t_2$ in which both the inverters are active, the MPPT algorithm will be performed by the inverter selected as master unit and the power modulation signal $S_W$ will be used actively by both the inverters 5A, 5B, i.e. by the inverter selected as master and by the inverter that behaves as slave.

In this way in the intervals $t_0$-$t_1$ and $t_2$-$t_3$, in which also in the theoretical condition of maximum power collectable (no clouds) by the photovoltaic panels 3 the power at the output panels does not exceed the design. Value $W_D$, all the power delivered by the source is concentrated on one single inverter instead of being distributed over two. This allows the system to work nearer the maximum efficiency point, reducing the fixed losses and also reducing exploitation of the inverter, statistically increasing the average life of the inverters of the system. When the theoretically available power (curve $W_{ID}$) is near or superior to the design power $W_D$, which is determined by a time signal and not by power detection, since the power could be affected by the presence of clouds, both the inverters are activated and controlled in parallel to absorb the same power, for example, and in this interval of time the master unit performs the MPPT algorithm, providing a power control signal also for the second unit, as described with reference to FIG. 3.

The concept described with reference to FIG. 5 for gradual switch-on of a variable number of inverters according to a time signal, for example, can also be extended to systems with more than two inverters. What is important is that switch-on and switch-off of the inverters does not occur according to the power actually available, which can fluctuate unpredictably due to atmospheric disturbances, but by following the theoretical curve $W_{ID}$ and therefore on the basis of the ideal sunlight conditions over time. It will obviously be preferable to regulate the system by setting the time intervals $t_0$-$t_1$-$t_2$-$t_3$ according to the season and/or latitude at which the system is installed.

This control logic does not reduce the adaptation speed of the system to the variations in the sunlight conditions and allows ideal behavior to be maintained as regards extraction of the maximum power available by means of efficient tracking of the maximum power point.

It is understood that the drawing only shows one example of implementation of the invention, which can vary in forms and arrangements without departing from the scope of the concept underlying the invention. Any presence of reference numbers in the attached claims is intended to facilitate reading of the claims with reference to the description and the drawing, and does not limit the scope of the protection represented by said claims.

The invention claimed is:

1. A method for managing a system for generation of electric power, the system including at least one direct current (DC) source which delivers at a DC source output an electric power subject to fluctuations, and a plurality of inverters comprising a respective control unit and having a respective inverter output and a respective inverter input connected to said DC source output, and wherein each of the inverters is functional to transform the electric power at the inverter input into ac electric power at the inverter output with controlled frequency and voltage, the method comprising the steps of:
selecting one of said inverters as a master unit and the remaining inverters as slave units;
performing, via said master unit, a maximum power point tracking algorithm to generate a power modulation control signal via said master unit; and
using said power modulation control signal to concurrently control and manage in parallel the master unit and at least an active one of the slave units to vary the power absorbed by said master unit and by said at least one active slave unit, so that each of said master unit and said at least one active slave unit delivers a variable power output that tracks the fluctuations of the power at the output of said direct current source by tracking a maximum power point via the maximum power point tracking algorithm performed by said master unit.

2. The method of claim 1, wherein said master unit and each of said slave units are controlled to each deliver substantially the same output power, said output power varying according to the power delivered by said direct current source.

3. The method of claim 2, wherein said power modulation control signal is effective to cause the voltage at the input of each of said master unit and said slave units to fluctuate around a value that maximizes the power delivered by said direct current source, simultaneously varying the power delivered by said master unit and said slave units via said power modulation control signal.

4. The method of claim 3, wherein said direct current source comprises at least one photovoltaic panel.

5. The method of claim 4, wherein said master unit performs said maximum power point tracking algorithm by cyclically perturbing the voltage at the direct current power source output and monitoring a variation in power delivered by said direct current source resulting from said perturbation, and said master unit generates the power modulation control signal for the power at the output of said master unit and said slave units such as to maintain the output voltage of said direct current source around the point of maximum power delivered by said source when an external parameter varies.

6. The method of claim 5, wherein said external parameter comprises a power per surface unit collected by said at least one photovoltaic panel.

7. The method of claim 6, wherein the power delivered by said inverters is controlled by controlling a phase displacement between voltage and current at the output of the inverters.

8. The method of claim 7 wherein one of said inverters is selected as master unit at a start-up of said system.

9. The method of claim 8, wherein one of said inverters is selected as master unit at each start-up of said system.

10. The method of claim 8 wherein at a start-up of said system, each inverter generates a respective random number and the master unit is selected on the basis of the random numbers generated by said inverters.

11. The method of claim 10 wherein the inverter that generates the highest random number is selected as the master unit.

12. The method of claim 10, wherein the inverter that generates the lowest random number is selected as the master unit.

13. The method of claim 1 wherein the power delivered by at least one of said inverters is varied so as to maintain said power around a maximum efficiency point of the inverter.

14. The method of claim 1 further comprising providing two inverters and modulating the power modulation control signal for the power delivered by each of said inverters so as to maximize the efficiency of said inverters.

15. The method of claim 1 wherein each of the inverters is coupled to said DC source, the method further comprising varying the power delivered by each of said inverters by means of said power modulation control signal generated by the master unit.

16. The method of claim 1 wherein the number of inverters connected in parallel at the output of said direct current source is varied over time to minimize the number of inverters active and to optimize the efficiency of each inverter, according to the theoretical maximum power that can be delivered by said DC source as a function of time.

17. An electric power DC/AC conversion system, comprising:
a plurality of inverters configured to be connected in parallel and each inverter comprising an inverter input, an inverter output and a respective control unit, wherein:
each of said inverters is functional to receive at the respective inverter input a dc electric power subject to fluctuations and for delivering an ac power with controlled frequency and voltage at the respective inverter output;
one of said inverters is defined as a master unit, and each of the other inverters is defined as a slave unit;
said master unit is effective to perform a maximum power point tracking algorithm on the direct current fluctuating at the input of said inverters, and
generate a power modulation control signal for each of said inverters; and
each of said control units is configured to concurrently control and manage in parallel at least an active one of said slave units and the master unit according to said power modulation control signal so that said master unit and said at least one active slave unit each deliver a variable power that tracks the fluctuations of the power at the output of said direct current source by tracking the maximum power point via the maximum power point tracking algorithm performed by said master unit to thereby provide at the inverter output of each of said master and slave units an ac power which is variable and modulated according to the fluctuating input power.

18. The system of claim 17 wherein each of the control units of said master unit and said slave units are configured to cause each of said master unit and said slave units to substantially deliver the same output power, said output power varying according to the input power.

19. The system of claim 18 further comprising a dc power source, the dc power source having an output coupled to the respective inverter inputs of each of said inverters.

20. The system of claim 19, wherein said dc power source comprises at least one photovoltaic panel.

21. The system of claim 20 wherein said power modulation control signal is effective to cause the voltage at the input of said master unit and said slave units to fluctuate around a value that maximizes the power delivered by said direct current source, simultaneously varying the power delivered by said master unit and said slave units using said power modulation control signal.

22. The system of claim 21 wherein each of the control units is configured to cause said master unit to perform said maximum power point tracking algorithm by cyclically perturbing the voltage at the output of the dc power source and observing the variation in power delivered by said direct current source resulting from said perturbation, and generating a power modulation control signal at the output of said master unit and said slave units such as to maintain the output voltage of said direct current source around the point of maximum power delivered by the source when an external parameter varies.

23. The system of claim 22 wherein said external parameter comprises a power per surface unit collected by said at least one photovoltaic panel.

24. The system of claim 23 wherein each of said control units is further configured to control the power delivered by said inverters by acting on the phase displacement between voltage and current at the inverter output of the inverters.

25. The system of claim 24 wherein each of said inverters is coupled to said direct current power source without the interposition of switching devices.

26. The system of claim 17 wherein each of said control units is further configured to select of one of said inverters as the master unit and the other inverters as slave units.

* * * * *